(12) United States Patent
Powers et al.

(10) Patent No.: US 10,504,008 B1
(45) Date of Patent: Dec. 10, 2019

(54) SYSTEM AND METHOD FOR RELOCALIZATION AND SCENE RECOGNITION

(71) Applicant: Occipital, Inc., Boulder, CO (US)

(72) Inventors: Jeffrey Powers, San Francisco, CA (US); Miguel Algaba, Malaga (ES); Nicolas Burrus, Madrid (ES)

(73) Assignee: Occipital, Inc., Boulder, CO (US)

( * ) Notice: Subject to any disclaimer, the term of this patent is extended or adjusted under 35 U.S.C. 154(b) by 0 days.

(21) Appl. No.: 15/652,893

(22) Filed: Jul. 18, 2017

Related U.S. Application Data

(60) Provisional application No. 62/363,491, filed on Jul. 18, 2016.

(51) Int. Cl.
| | |
|---|---|
| *G06K 9/66* | (2006.01) |
| *G06K 9/48* | (2006.01) |
| *G06K 9/62* | (2006.01) |
| *G06K 9/46* | (2006.01) |

(52) U.S. Cl.
CPC ............. *G06K 9/66* (2013.01); *G06K 9/4661* (2013.01); *G06K 9/481* (2013.01); *G06K 9/6282* (2013.01); *G06T 2207/10024* (2013.01); *G06T 2207/10028* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 2015/0294189 A1* | 10/2015 | Benhimane | G06K 9/623 382/195 |
| 2017/0169620 A1* | 6/2017 | Bleiweiss | G06F 17/50 |
| 2017/0256065 A1* | 9/2017 | Wu | G06T 7/215 |

* cited by examiner

*Primary Examiner* — David Perlman
(74) *Attorney, Agent, or Firm* — Lee & Hayes, P.C.

(57) ABSTRACT

A system configured to improve the operations associated with generating virtual representations of physical environments to recognize the physical environments and/or relocalize within the virtual representations in a substantially real time system. In some cases, the system may use a first pre-training phase of descriptors and/or split nodes of regression forests using features common across various scenes to learn general image appearance, and a second training phase of descriptors and/or leaf nodes of regression forests to learn scene specific features. The system may align the features using an orientation vector, correct for camera perspective and lens distortion of the features as well as learn robust illumination invariant features from real and synthetic data.

20 Claims, 11 Drawing Sheets

SYSTEM AND METHOD FOR RELOCALIZATION AND SCENE RECOGNITION

CROSS-REFERENCE TO RELATED APPLICATION(S)

This application claims priority to U.S. Provisional Application No. 62/363,491 filed on Jul. 18, 2016 and entitled "Relocation Methods and Inventions," which is incorporated herein by reference in its entirety.

BACKGROUND

The presence of three-dimensional (3D) imaging systems, mixed reality systems, and 3D representations of real physical environments are becoming more and more commonplace. In some cases, it is also common place for users of the 3D image or mixed reality systems to revisit physical environments or scenes on more than one occasion. In these cases, the system may have to rebuild the virtual environment or relocate the individual within the virtual environment, both of which can be computationally intensive and difficult to achieve in substantially real-time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
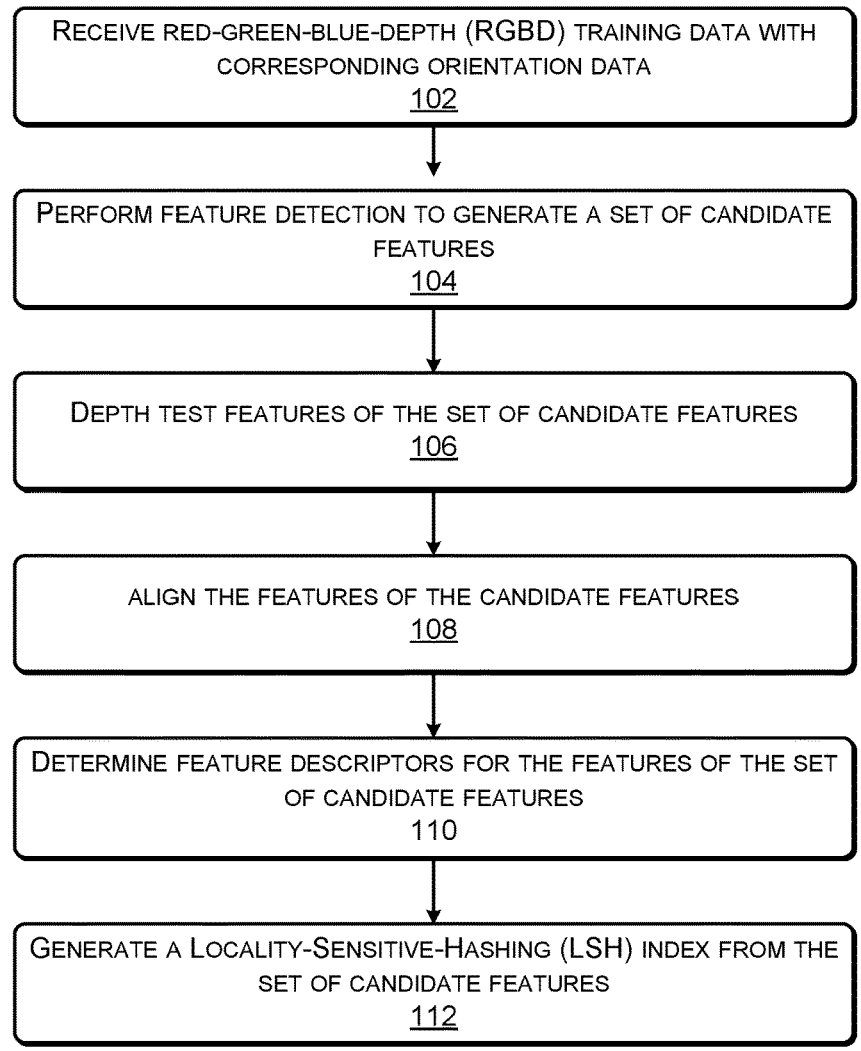
FIG. 1 is an example flow diagram showing an illustrative process for training features and feature descriptors for use by a spatial interaction system according to some implementations.

This disclosure includes techniques and implementations for determining the pose of a spatial interaction system with respect to a 3D environment. For example, a user may capture image data associated with a home or another physical environment using an electronic device, for instance, a mobile device or image capture device associated with a virtual reality or spatial interaction system. In some cases, the image capture device may be equipped with image components capable of capturing image data and/or depth data associated with the physical environment. The captured image data may be utilized by a spatial interaction system, such as a remote image system, an application associated with the device, or a combination thereof, to generate the 3D model, 3D textured model, or mesh of the physical environment as well as to place or orientate features (e.g., objects, boundaries, portions of objects, object intersections, such as corners of a wall, textures, etc.) and the user within the virtual representation of the physical environment.

In some examples, the system may place the features as well as locate or relocate a user within an existing virtual environment using image data of the physical environment together with pose information associated with the images, the user, and/or the features. For instance, the image capture device (or a device associated with the image capture device) may be equipped with inertial measurement units (IMU), global positioning system units (GPS), accelerometers, gyroscopes, magnetometers, or a combination thereof that may be used to collect position and/or orientation data that is usable to identify a position or pose of the mobile device as the image is captured. In some cases, the system may also analyze the image to identify features or the pose of the image capture device.

In one example, the existing virtual environment, objects within the virtual environment, and/or pixels associated with the virtual environment may have an associated gravity vector, down direction, and/or ground plane. The spatial interaction system may utilize the IMU data (e.g., the acceleration data and orientation data) to determine a gravity vector associated with the images or image data being captured by the image capture device. The spatial interaction system may utilize the gravity vectors assigned to the features of the image and/or the image capture device to align features with the down direction or ground plane of the existing virtual environment. For instance, the gravity vectors and alignments allows the spatial interaction system to remove rotational variability caused by possible camera rotations within a plane with respect to possible alignment of the features within the existing virtual environment.

For instance, in one example, the gravity vectors may be used to determine an upright descriptor (e.g., an orientation invariant descriptor of the feature) for each feature to assist with aligning the features into the virtual environment. In some cases, the upright descriptor for a feature may be used in combination with other descriptors, such as color descriptors, shape descriptors, depth descriptors, etc. when aligning the feature with the virtual environment. In some cases, upright descriptors may also be associated with the virtual environment, existing features of the virtual environment, and/or pixels of the virtual environment.

In contrast, conventional systems rely on image gradient to determine the orientation of the features within the virtual environment. However, in some cases, such as indoor environments the image data may not include an image gradient or the gradient may not be aligned in the presumed direction, which leads to false positives and false alignment of features. Thus, use and/or generation and use of upright descriptors and gravity vectors allows for alignment of the feature with the down direction even in images in which image gradients are not present and duces the number of pose hypotheses to be tested when determining the pose of the spatial interaction system within the 3D environment. In this manner, the system described herein may allow the system to align features and/or locate the user within an environment within a shorter period of time and at the expenditure of fewer processing resources than conventional systems. In some cases, the use of the upright descriptors and gravity vectors, may allow the system described herein to rely on more random/anisotropic descriptors than the conventional systems, which in turn allows for alignment in situations in which the pixels comparisons have substantially less correlation. As a result, the spatial interaction system described herein may better differentiate similar texture patterns with different orientations than the conventional systems.

In some implementations, lens distortion and/or perspective distortion may be used in combination to the gravity vectors to align features with the virtual environment. For example, distortion in an image (such as curvatures in straight lines around the edge of the images) may be caused by the lenses of the image capture device. In some cases, the spatial interaction system may utilize pre-calibrated camera intrinsic parameters to determine an expected projection of the gravity vector over the distorted image to determine a difference between the projected gravity and down direction taking into account both the perspective distortion and lens distortion. In this manner, the spatial interaction system may perform operations to correct the perspective and the lens distortion. For instance, a door feature may appear as a trapezoid or a rectangle depending on the position of the image capture device. In the current example, if the camera is to the right of the physical door, the door feature may be represented as a trapezoid shifted or tilted to the left of the upright position. In this example, the spatial interaction system may utilize the gravity vector and pre-calibrated camera intrinsic parameters to determine the upright position of the door. In some cases, the gravity vector, and/or down direction may be utilized to compute the upright descriptor of a feature. In one specific example, the spatial interaction system may suspend the feature points within a 3D space and draw the gravity vector in the 3D space. The spatial interaction system may then project the gravity vector into the image to orientate the upright descriptors of the features within the image.

In another example, a magnetometer in the IMU or an independent magnetometer unit may be associated with the image capture device and utilized to generated a magnetic vector (e.g., a magnetic north vector or magnetic south vector in relation to a coordinate system, such as Cartesian coordinate system, Geographic coordinate system, Dipole coordinate system, as well as other coordinate systems) and/or magnetic descriptor related to the features within the image. Similar to using the gravity vector, the spatial interaction system may utilize a magnetic vector or magnetic descriptors to align the features of a captured image with respect to the virtual environment or scene. In some cases, the magnetic vector and/or descriptors may be used in lieu of or in combination with the gravity vectors and descriptors to align features with a virtual environment.

In one specific example, the spatial interaction system may utilize real or synthetically rendered data to train a machine learning system recognize an environment or scene. For example, the spatial interaction system may utilize an oriented FAST and rotated BRIEF (ORB) approach to feature generation. In these cases, the spatial interaction system may learn discriminative features based on the upright descriptors (and/or magnetic descriptors) as well as other descriptors to allow for substantially increased feature matching and pose estimation accuracy. In one example, the spatial interaction system may receive a training red green blue-depth (RGBD) frame, image, or data including camera pose, gravity vector, depth image, and color image. The spatial interaction system may first perform feature detection on the color image and depth data of the RGBD data to identify one or more potential features. The spatial interaction system may then discard or prune the potential features based on the depth image (e.g., features with unreliable depths are discarded). The potential features may be aligned with gravity or the magnetic north/south using the gravity vector or magnetic vector of the RGBD data. In some cases, potential features having feature points or spatial geometries that are unreliable after gravity alignment is complete may be discarded as well. For example, the gravity and/or magnetic aligned features may be used to disambiguate similar corner features which may be project rotated on the image plane.

Once the hypothesis features are pruned and aligned with gravity or magnetic north/south, the spatial interaction system may determine world feature coordinates (e.g., a location within or associated with an environment or scene) using the camera pose data and the gravity aligned features. For example, the spatial interaction system may determine 3D keypoints associated with the feature and the environment or scene and may store the coordinates (e.g., 3D keypoints) in a database. The spatial interaction system may also utilize the gravity aligned features and the color image of the RGBD data generate feature descriptions (e.g., upright descriptors, magnetic descriptors, color descriptors, feature point descriptors, etc.). In some cases, the 3D keypoints may have a 1:1 mapping to feature descriptions.

The feature descriptions and, in some instances, the 3D keypoints may be used by the spatial interaction system to generate a Locality-Sensitive-Hashing (LSH) index mapping the descriptors to the keypoint indices within the environment or scene. In some examples, the feature descriptors and the LSH index may also be stored with the 3D keypoints or world coordinates and the metadata associated with each training RGBD frame (e.g., 2D feature location for each stored feature, the index of the RGBD data, the camera pose associated with the RGBD data, etc.).

In some implementations, the spatial interaction system may be configured to generate local feature descriptors for specific environments or scenes. In some cases, the spatial interaction system may develop a datastore or database of descriptors of features common to specific types of environments or scenes or associated with a specific physical environment or scene. For example, feature descriptors for features common to an indoor environment (e.g., corners, furniture, windows, doors, cabinets, etc.) may be learned in a manner that the descriptors may be utilized to improve alignment and localization for images captured of indoor environments.

In some cases, the local feature descriptors and/or the LSH index formed from the local feature descriptors may be specific to a scanned environment. For example, the local feature descriptors and/or LSH index may be associated with an individual's room, office, home, etc. In some cases, in addition to training data associated with the scanned environment, the local feature descriptors and/or the LSH index maybe generated using training data associated with similar environments or nearby/co-located environments.

In these implementations, the spatial interaction system may receive initial RGBD training data associated with a type of scene or a specific environment. The spatial interaction system may first perform keypoint detection on the training RGBD data and orientate the features represented by the keypoints with respect to a perspective. For instance, perspective and camera distortion may be removed from the features and the features may be gravity or magnetic aligned. The spatial interaction system may also randomly generate a number of candidate feature descriptors. The random candidate feature descriptors may then be evaluated over the set of keypoints generated from the training RGBD data. For example, if a set of K keypoints were generated from the RGBD data and N random candidate feature descriptors are selected, a training database for the indoor environment (e.g., a specific environment or a type of scene) having D*N samples may be generated. The samples may then be used to form an LSH index for each candidate descriptor.

In some cases, the RGBD training data may be captured for an environment or scene under particular lighting or illumination conditions. For instance, if a user of the spatial interaction system desires to create a virtual representation of the user's room, the user may capture a plurality of images of the room at one time. For instance, the user may capture a series of images or video data of the room over a relatively short period of time. In this case, the image or video data capture may have similar lighting or illumination conditions, which can result in increased difficulty when localizing features of images captured under different lighting effects (e.g., the training data is captured during the day and the localization image is captured at night).

To reduce illumination concerns, in some cases, the spatial interaction system may simulate illumination changes at different levels of the image to allow for better training data and localization under illumination changes. For example, the spatial interaction system may infer material properties of the different surfaces of the environment during the 3D scanning stage to render photorealistic illumination under different conditions. Similarly, the spatial interaction system may render multiple training viewpoints to increase robustness to scale, perspective and accommodate viewpoint changes. The spatial interaction system next determines candidate features and feature descriptors associated with the modified RGBD data. The candidate feature descriptors are tested by matching each modified feature to samples stored in the LSH index samples in the LSH-index. Each of the candidate feature descriptors are assigned a number of true positive and a number of false positive matches with the samples in the LSH index. The number of true positive and the number of false positive are used to rank the candidate feature descriptors. For example, the spatial interaction system may score the quality of the matching for each descriptor and select the candidate feature descriptors with the highest scores as the local feature descriptors for the given scene or environment.

In some cases, when a user is relocating within a scene or environment associated with the local feature descriptors or the spatial interaction system is localizing a feature of an image of the environment within the virtual environment or scene generated using the local feature descriptors, the spatial interaction system may first detect a first feature within the image and gravity align the first feature to generate at least one first feature descriptor, as discussed above with the training RGBD data. For instance, the spatial interaction system then performs a Fast Approximate Nearest Neighbor search on the local feature descriptors associated with the scene or environment to identify a predetermined number (such as two) closest scene feature descriptors to the local feature descriptors. In some cases, the Hamming distance between matched feature descriptors can be used to reject possible false matches. In some cases, where sensor depth data is available, pose estimation may be performed on the matches using 3D-3D correspondences for six degree of freedom camera pose. In the case, only 2D image data is available or incomplete 3D sensor data is available 3D-2D correspondences and/or 3D-3D correspondences can be used for six degree of freedom camera pose.

In another example, the spatial interaction system may utilize a regression forest approach to map 2D image appearance to the 3D geometry of the environment. In this example, the spatial interaction system may use a set of training images with camera pose data and IMU data to train the descriptors learnt by the forest during an offline pre-training phase. This pre-training phase is performed once and is not specific to the environment the user relocalizes. In this example, rather than learning the mapping from 2D appearance to 3D geometry specific to the environment, a forest or plurality of trees are pre-trained to learn the appearance of a type of scene. For example, the interior or non-leaf nodes may be trained during the pre-training phase to learn the appearance of a type of scene (e.g., a living room, kitchen, airplane interior, etc.). In this example, the leaf nodes, that learn the 3D geometry specific to the environment, are then updated in substantially less time as new image data associated with the specific environment or scene is received.

During the pre-training phase, the plurality of trees may be trained using a dataset including a large weak learner parameter space and a plurality of training features. For example, each tree of the relocation forests discussed herein, may include nodes having a weak learner, represented as a $\theta=(\phi, \tau)$, where $\phi$ is a feature and $\tau$ is a scalar threshold, and a splitting objective. The splitting objective may be a function that splits the training data across the children nodes of each internal non-leaf node. During the training phase, the in-plane orientation, such as alignment via the gravity vector, may be passed down each tree to align each feature with the desired projected gravity. In some cases, the magnetic orientation may also be passed down each tree to align the features with the desired magnetic orientation. For example, one splitting objective function could favor an uniform distribution of training samples across the children nodes.

Additionally, a variable weak learner parameter space could be used at each level of the trees. In one example, the number of tests may be reduced at each lower level of the tree to train the forest in less time Once images of a specific environment or scene is received by the spatial interaction system, the spatial interaction system may train the leaf nodes of the tree. In this manner, during substantially real-time or real-time data capture the 3D location of the feature may be determined but general appearance of the features are already known. Thus, the system may operate to allow substantially real-time or real-time spatial interaction with the virtual environment or scene. In other words, by utilizing a two-phase training for the relocation forest trees, the training of the trees allows the spatial interaction system to learn the general structure of the features and objects but the training of the leaf nodes allows the spatial interaction system to learn the 3D location or coordinates of the features within the specific environment or scene. For example, during the pre-training phase the forest may learn the appearance of a feature (such as color descriptors, size descriptors, orientation descriptors, texture descriptors, or other appearance descriptors) and during the real-time training phase the trees of the forest may learn the 3D location of a particular feature or a 3D spatial relationship between multiple features.

As discussed above the initial training RGBD data may be a set of images or video data that has similar illumination, such as when an individual captures the initial training data associated with the environment over a short period of time or in one period of time. In one implementation discussed herein, the forest training may compute illumination invariant descriptors to compensate for illumination changes. The illumination invariant descriptor may be represented as follows:

$$f_\phi(p) = \frac{I\left(p + \frac{\delta 1}{D(p)}, c1\right)}{I(p, c1)} - \frac{I\left(p + \frac{\delta 2}{D(p)}, c2\right)}{I(p, c2)}$$

Where f is the feature, p is a pixel, $\delta 1$ is a first 2D offset, $\delta 2$ is a second 2D offset, D(p) is a depth of p, I(x, c) is the color of x at channel c. The descriptor is configured such that $f_\phi(p)$ is normalized by the color of the central pixel, thereby improving the relocalization accuracy under illumination changes. For example, the local appearance of a pixel p is represented by the difference in color between two nearby pixels offset by $\delta 1$ and a third pixel offset by $\delta 2$.

In one implementation, the effects of changes in illumination may be further reduced during the relocalization phase by introducing synthetic or computer generated renderings of the RGBD training data. In other words, the training data may include computer generated features over various lighting effects and conditions. The synthetic data may then be used to train the trees and/or feature descriptors. In some cases, material properties of the surfaces can be inferred during the scene capture phase, and then used to generate photorealistic synthetic RGBD data for training.

In the current example, when using the relocation forest, the spatial interaction system may precompute scene specific information prior to determining a camera pose and relocalizing with a scene. For instance, the spatial interaction system may precompute a number of randomly generated 2D to 3D matches, which may be reused later. For example, the precomputed 2D to 3D matches may be stored in adjacent cells of a memory device such that candidate 2D to 3D matches may be loaded and accessed at high speeds and throughput. When compared with the conventional approach of determining 2D to 3D matches by repeatedly sampling a captured image, the overall speed and throughput of the system during run time may be improved, as repeatedly sampling an image is computationally expensive. In some cases, the precomputed samples may be selected from the RGBD data at location in which the RGBD data has high gradient to increase reproducibility of the features over random sampling.

In one specific example, the 2D to 3D matches may be precomputed once and reused for all possible pose hypotheses, in contrast to conventional systems that sample the image multiple times for different pose hypotheses. In this manner, the operations associated with computing the 2D to 3D matches may be performed in parallel using multiple threads which may significantly improve the speed and throughput of the spatial interaction system when compared to conventional systems that process the 2D to 3D matches in a serial manner as each individual pose hypothesis is evaluated. Once the samples are precomputed based on the captured images, the pose hypotheses may be localized and evaluated within the virtual environment or scene using the predicted 2D to 3D matches.

In another example, rather than accumulating samples of 2D to 3D matches, the spatial interaction system may accumulate the 3D samples into a voxel grid or a volume to model the probability density function of the 2D to 3D mapping. Thus, for each leaf node there is a voxel grid approximating the 3D distribution of features with similar image appearance. Said probability distribution function would be used to improve the accuracy of the pose hypothesis estimation and validation. For example, the precomputed voxel grid may be used during pose estimation to rank the hypotheses based on the likelihood of occurrence of all the observed features in the image.

During the localization or relocalization process, the spatial interaction system may test various hypotheses when determining the feature and/or the 3D location of the feature within the environment. For instance, the spatial interaction system may test various hypotheses when determining the feature and/or the 3D location of the feature within the environment or test various pose hypotheses when determining the pose of the camera within the environment. In some cases, the spatial interaction system may generate a number of RANSAC based hypotheses for a given feature and reject incorrect pose hypotheses using a preemptive-RANSAC scheme. The hypotheses tend to cluster around a true estimate of the feature or around a true estimate of the pose so the spatial interaction system, discussed herein, may generate a weighted average hypothesis. The weighted average hypothesis may be the combination of the weighted average of the translation component and the weighted average of the rotation component of the selected N top hypotheses.

The spatial interaction system may also gravity align the weighted average hypothesis. For example, at each RANSAC iteration, the spatial interaction system may add a gravity aligned hypothesis to the set of hypotheses. The gravity aligned hypothesis may be generated by rotating a new hypothesis (generated based at least in part on a translation component of the best hypothesis) so that the Y-axis aligns with the gravity vector.

Once a final set of hypotheses are generated, the spatial interaction system may perform a gravity check. For example, the spatial interaction system may compute the estimated projected gravity vector for each of the remaining pose hypotheses and then reject the incorrect ones when the estimated projected gravity vector from the 3D model and the projected gravity vector from the IMU differ by more than a threshold amount. In some cases, the remaining hypotheses are then verified using a 3D to 3D inlier check and a final hypothesis is selected for the feature of the camera pose. In some examples, the final set of hypotheses or the final hypothesis may be refined using an interactive closest point (ICP) process. The ICP process may also utilize translation and rotation deltas estimations to reject hypotheses when the motion is greater than a motion threshold.

Figure 2:
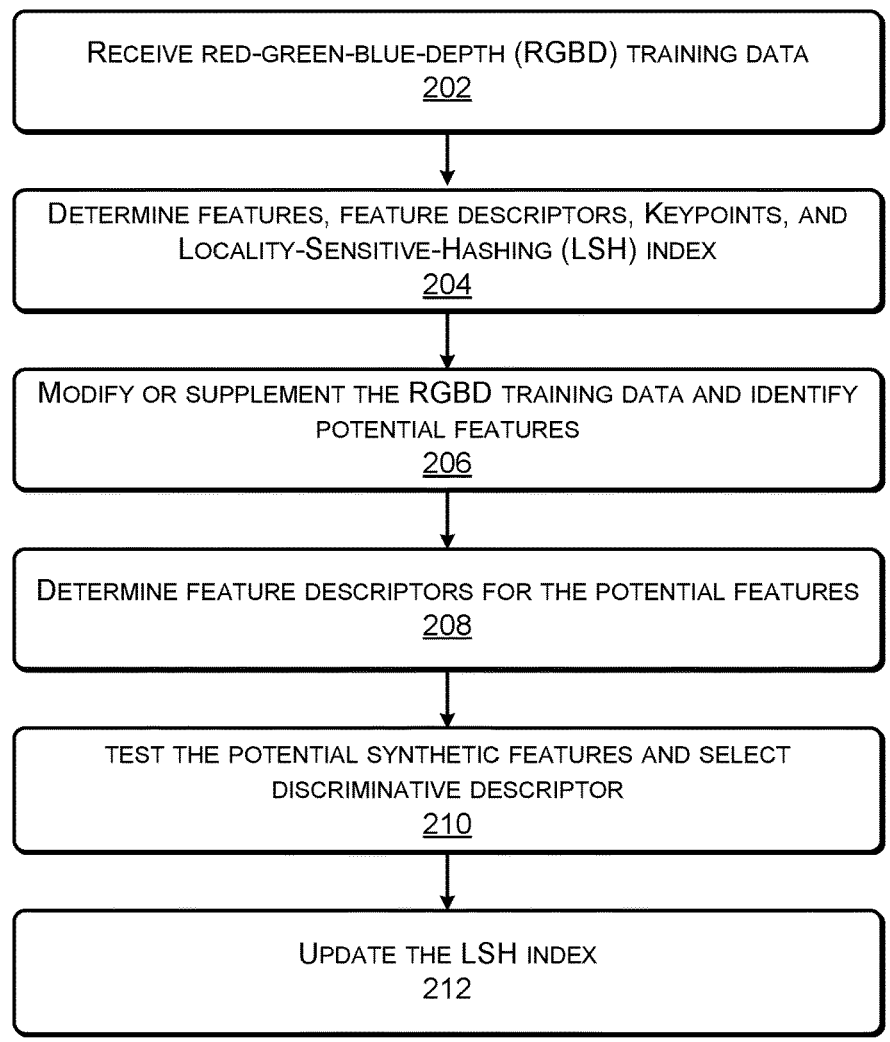
FIG. 2 is another example flow diagram showing an illustrative process for training features and feature descriptors for use by a spatial interaction system according to some implementations.
Figure 3:
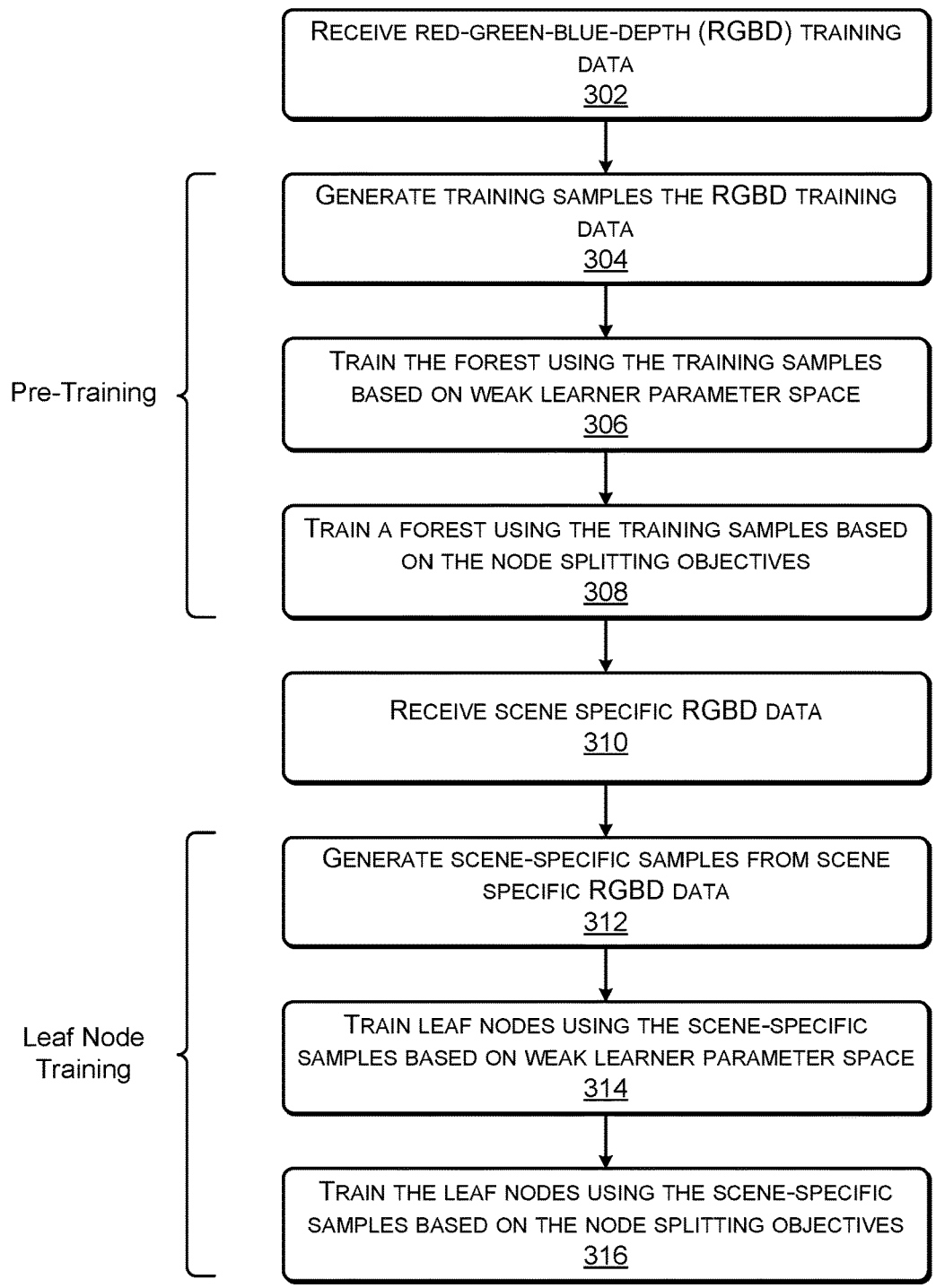
FIG. 3 is another example flow diagram showing an illustrative process for pre-training features and feature descriptors for use by a spatial interaction system according to some implementations.

FIGS. 1-3 are flow diagrams illustrating example processes associated with training a relocalization system to localize and relocalize features and/or individual within a virtual environment or scene according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 1 is an example flow diagram showing an illustrative process 200 for training features and feature descriptors for use by a spatial interaction system according to some implementations. For example, the spatial interaction system may utilize real or synthetically rendered data to train a machine learning system recognize an environment or scene. In the current example, the spatial interaction system may utilize an ORB approach to feature generation and localization. In general, the ORB approach utilizes keypoints together with feature descriptors to represent, detect, and learn features as well as to localize features within a virtual scene.

At 102, a spatial interaction system may receive a set of RGBD training data. For example, the RGBD training data may include images or video data associated with a plurality of similar physical environments (e.g., a plurality of images of beaches, a plurality of images of forests, a plurality of images of bed rooms, etc.). In other examples, the RGBD training data may be specific to a particular physical environment (e.g., a user's home, bedroom, office, backyard, etc.). In some cases, the RGBD training data may be captured over a plurality of time periods, while in other cases, the RGBD training data may be captured in close temporal proximity. In some examples, the RGBD training data may include frames, images, or data such as camera pose, gravity vector, depth image, and color or color image.

In some cases, the set of RBGD training data may include orientation data associated with, for instance, each frame or image of the RBGD training data. In some cases, the orientation data may be captured or determined from data captured by one or more IMU sensors associated with the image capture device. For instance, the image capture device may include an IMU or a device in proximity to the image capture device may include an IMU.

At 104, the spatial interaction system may perform feature detection to generate a set of candidate features. In one example, the spatial interaction system may perform feature detection on the color images associated with the RGBD training data to identify one or more potential features. For example, the spatial interaction system may perform operations associated with Features from Accelerated Segment Test (FAST) detection technique to determine features based at least in part on the color images.

At 106, the spatial interaction system may depth test features of the set of candidate features. For example, the spatial interaction system may discard or prune the potential features with unreliable depths.

At 108, the spatial interaction system may align the features of the candidate features. For example, the candidate features may be aligned with gravity or the magnetic north/south using the gravity vector or magnetic vector of the RGBD data. In some cases, candidate features having feature points or spatial geometries that are unreliable after gravity alignment is complete may be discarded as well. For example, the gravity (and/or magnetic) aligned features may be used to disambiguate similar corner features which may be projected rotated on the image plane. In other cases, the spatial interaction system may align the features using other types of orientation vectors. In some cases, the spatial interaction system may determine world feature coordinates (e.g., a location within or associated with an environment or scene) for the features of the set of candidate features. For example, once the candidate features are aligned with gravity (or magnetic north/south), the spatial interaction system may determine 3D keypoints associated with the feature and the environment or scene.

At 110, the spatial interaction system may determine feature descriptors for the features of the set of candidate features. For example, the spatial interaction system may utilize the gravity aligned features and the color image of the RGBD data generate feature descriptions (e.g., upright descriptors, magnetic descriptors, color descriptors, feature point descriptors, etc.). In the current example, the feature descriptors may include upright descriptors and/or magnetic descriptors in addition to other descriptors, such as BRIEF descriptors, color descriptors, texture descriptors, shape descriptors, motion descriptors, among others. The upright descriptor may include a gravity orientation or down direction and the magnetic descriptor may include an orientation of the feature with respect to a magnetic north or south along a coordinate system.

At 112, the spatial interaction system may generate a LSH index from the set of candidate features. For example, the LSH index may be a mapping of the 3D keypoints indices to the descriptors of a feature. In some cases, the 3D keypoints may have a 1:1 mapping to feature descriptions. In some implementations, the feature descriptors and the LSH index may also be stored with the 3D keypoints or world coordinates and the metadata associated with each training RGBD frame (e.g., 2D feature location for each stored feature, the index of the RGBD data, the camera pose associated with the RGBD data, etc.).

FIG. 2 is another example flow diagram showing an illustrative process 200 for obtaining features and discriminative feature descriptors for use by a spatial interaction system according to some implementations. In some implementations, the spatial interaction system may be configured to generate local feature descriptors for specific physical environments or scenes. In these implementations, the spatial interaction system may develop a datastore or database of descriptors of features common to specific types of environments or scenes or associated with a specific physical environment or scene, such as feature descriptors for features common to an indoor environment (e.g., corners, furniture, windows, doors, cabinets, etc.) may be learned in a manner that the descriptors may be utilized to improve alignment and localization for images captured of indoor environments.

At 202, a spatial interaction system may receive a set of RGBD training data. For example, the RGBD training data may include images or video data associated with a plurality of environments (e.g., images of beaches, forests, bed rooms, etc.). In some examples, the RGBD training data may include frames, images, or data such as camera pose, gravity vector, depth image, and color image.

At 204, the spatial interaction system may determine features, feature descriptors, Keypoints, and LSH index. For example, the spatial interaction system may generate the features, feature descriptors, Keypoints, and LSH index as discussed above with respect to FIG. 1.

At 206, the spatial interaction system may modify or supplement the RGBD training data and identify potential features. For example, in some cases, the local feature descriptors and/or the LSH index formed from the local feature descriptors may be specific to a scanned environment. In these examples, the spatial interaction system may receive initial RGBD training data all having similar illumination effects or viewpoints (e.g., the training data is captured in close physical and temporal proximity).

Thus, in some cases, the spatial interaction system may randomly generate a number of potential features or feature descriptors. In other instances, the spatial interaction system may generate potential synthetic (or computer generated) features using stored 3D models and common material properties associated with the represented environment. In some cases, the spatial interaction system may simulate illumination changes at different levels of the RGBD training data to allow for better training data and localization under illumination changes using the synthetic or computer generated features as additional training data. In some cases, the spatial interaction system may generate potential synthetic features by applying perspective distortion to the RGBD training data to accommodate viewpoint changes.

At 208, the spatial interaction system determines feature descriptors for the potential features and potential synthetic features. For example, the spatial interaction system may utilize the gravity vector or magnetic vector to determine upright descriptors and/or magnetic descriptors. In some cases, the feature descriptors may also include other descriptors, such as BRIEF descriptors, color descriptors, texture descriptors, shape descriptors, motion descriptors, among others.

At 210, the spatial interaction system may test the potential synthetic features and select discriminative descriptors. For example, the spatial interaction system may test the feature descriptors of each of the potential synthetic feature. In some cases, the feature descriptors may be tested by matching each feature descriptor to samples stored in the LSH index and generated from the original RGBD training data. In one specific example, the spatial interaction system may score the quality of the matching for each feature descriptor and select the potential synthetic feature based on the scores.

At 212, the spatial interaction system may update the LSH index to include the selected potential synthetic feature and corresponding feature descriptors. The updated LSH index may then be stored with the 3D keypoints or world coordinates and the metadata associated with each training RGBD frame (e.g., 2D feature location for each stored feature, the index of the RGBD data, the camera pose associated with the RGBD data, etc.), as discussed above.

FIG. 3 is another example flow diagram showing an illustrative process for pre-training features and feature descriptors for use by a spatial interaction system according to some implementations. In some implementations, the spatial interaction system may utilize a regression forest approach to map 2D image appearance to the 3D geometry of the environment. In this example, the spatial interaction system may use a set of training images with camera pose data and IMU data to train the descriptors learnt by the forest during an offline pre-training phase. The leaf nodes may then be trained or updated in substantially real-time as new image data specific to a physical environment or scene is received.

At 302, a spatial interaction system may receive a set of RGBD training data. For example, the RGBD training data may include images or video data associated with a plurality of physical environments (e.g., a plurality of images of beaches, a plurality of images of forests, a plurality of images of bed rooms, etc.). In some examples, the RGBD training data may be generic or unrelated to a specific physical environment.

At 304, the spatial interaction system may generate training samples from the RGBD training data. For example, the spatial interaction system may generate a dataset including a weak learner parameter space and a plurality of training features. In some cases, the training features may include gravity aligned features and/or magnetic aligned features. In some cases, each tree of the forest discussed herein, may include nodes having a weak learner, represented as a $\theta=(\phi, \tau)$, where $\phi$ is a feature and $\tau$ is a scalar threshold, and a splitting objective. The weak learner is a function of the feature $f(\phi)$ and the scalar threshold. That is, a weak learner is a function that takes a feature with its corresponding parameters and a scalar threshold and produces a binary response (produces a simplified binary description of the feature). If the feature descriptor $f(\phi)$ is above a threshold, the weak learner function evaluates to 1. In contrast, if the feature descriptor $f(\phi)$ evaluates to a value under the threshold, the weak learner function evaluates to 0. Therefore, the weak learner parameter space represents the space of possible features to test as well as the space of possible thresholds to consider for testing At 306, the spatial interaction system may train the interior nodes of the forest using the training samples based on weak learner parameter space. For instance, the in-plane orientation, such as alignment via the gravity vector, may be passed down each tree to align each feature with the desired projected gravity. In some cases, the magnetic orientation may also be passed down each tree to align the features with the desired magnetic orientation.

At 308, the spatial interaction system may train the interior nodes of the forest using the training samples based on one or more node splitting objectives. The splitting objective may be a function that splits the training data across the children nodes of each internal non-leaf node. For example, one splitting objective function could favor uniform distribution of training samples across the children nodes and the number of tests may be reduced at each lower level of the tree. For example, the spatial interaction system may apply a maximum reduction in spatial variance or minimum absolute difference in children sample sets size as the node splitting objectives. The maximum reduction in spatial variance objective tries to reduce the 3D spatial variance of the samples as much as possible with each split. The minimum absolute difference in children sample sets size objective tires to uniformly distribute samples across children nodes in order to maintain the trees balanced.

At 310, the spatial interaction system may receive scene specific RGBD data. For example, an individual may generate a virtual representation of a specific physical environment (e.g., a user's home, bedroom, office, backyard, etc.). In these cases, the RGBD data may be captured of the specific physical environment and used to train the leaf nodes of the forest. In some cases, the scene specific RGBD data may be captured over a plurality of time periods, while in other cases, the scene specific RGBD data may be captured in close temporal proximity.

At 312, the spatial interaction system may generate scene specific samples for the scene specific RGBD data. For example, the spatial interaction system may generate a plurality of random samples represented as a pixel value and a continuous 3D position of the feature within the environment or scene.

At 314, the spatial interaction system may train the forest using the training samples based on weak learner parameter space, and at 318, the spatial interaction system may train the leaf nodes of the forest using the scene specific samples based on one or more node splitting objectives. For example, during the leaf node training the spatial interaction system may remove any empty branches and add any missing branches based on the weak learner parameter and/or the node splitting objectives. For example, the spatial interaction system may remove dead branches during pre-training. For instance, it is possible that some intermediate split nodes don't have children nodes and/or some nodes do not receive training samples. As a consequence these branches are removed since these branches do not describe the appearance of the training samples. Similarly, during the real-time leaf node training, it could happen that some intermediate split nodes not containing children, need to be further split to produce deeper branches (filling missing branches during pre-training).

In one specific example, the leaf node training may include generating perspective and distortion aware gravity aligned features. As discussed above, the nodes are represented as a $\theta=(\phi, \tau)$, where $\phi$ is a feature and $\tau$ is a scalar threshold. In these cases, the spatial interaction system may project a gravity vector from IMU. The projected gravity is then compared against the down direction and the in-plane orientation for each training sample is determined. The in-plane orientation may be passed down each tree to align the featured represented by the forest with the projected gravity.

In another specific example, either the original RGBD training data and/or the scene specific RGBD data may include image captured under similar lighting conditions. In one example, to compensated for narrow sampling of illumination characteristics, the forest may be trained using an illumination descriptor. For instance, the illumination descriptor may be represented as follows:

$$f_\phi(p) = \frac{I\left(p + \frac{\delta 1}{D(p)}, c1\right)}{I(p, c1)} - \frac{I\left(p + \frac{\delta 2}{D(p)}, c2\right)}{I(p, c2)}$$

Where f is the feature, p is a pixel, $\delta 1$ is a first 2D offset, $\delta 2$ is a second 2D offset, $D(p)$ is a depth of p, $I(x, c)$ is the color of x at channel c. The descriptor is configured such that $f_\phi(p)$ is normalized by the color of the central pixel, thereby improving the relocalization accuracy under illumination changes. For example, the local appearance of a pixel p is represented by the difference in color between two nearby pixels.

It should be understood that in the process 300, the interior or non-leaf nodes may be trained during the pre-training phase to learn the appearance of a type of scene (e.g., a living room, kitchen, airplane interior, etc.) and the leaf nodes may be trained later, such as during run time. In this manner, during substantially real-time or real-time data capture the 3D location of the feature may be determined but general appearance of the features are already known. Thus, the system may operate to allow substantially real-time or real-time spatial interaction with the virtual environment or scene.

Figure 4:
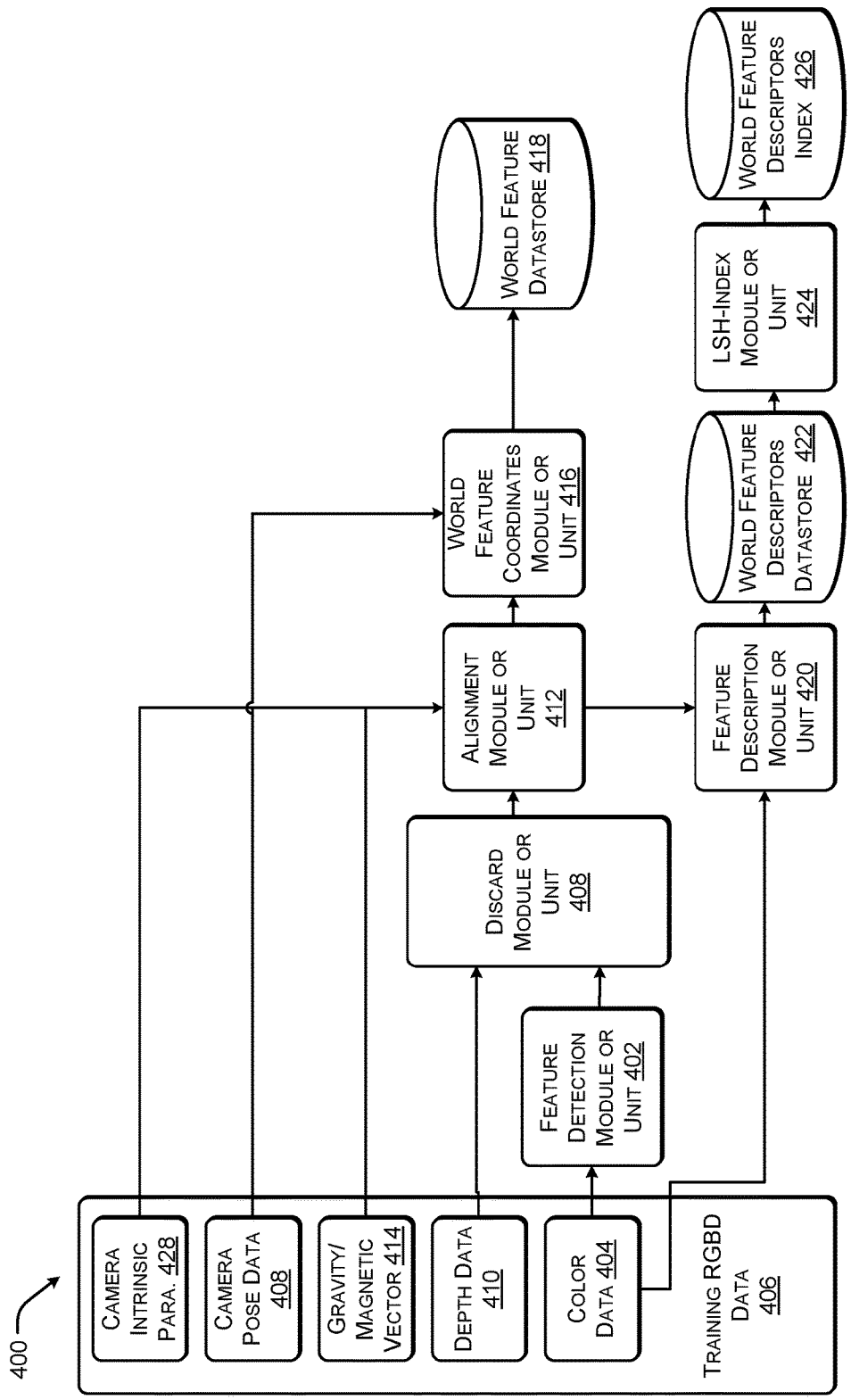
FIG. 4 is an example partial block partial flow diagram showing an illustrative spatial interaction system according to some implementations.

FIG. 4 is an example block diagram showing an illustrative spatial interaction system 400 according to some implementations. In the current example, the spatial interaction system 400 may utilize real or synthetically rendered data to train a machine learning system recognize an environment or scene. For example, the spatial interaction system 400 may utilize an ORB approach to feature generation. In the illustrated example, the spatial interaction system 400 may learn discriminative features based on the upright descriptors (and/or magnetic descriptors) as well as other descriptors to allow for substantially increased feature matching and pose estimation accuracy.

In the illustrated example, a feature detection module or unit 402 may receive an color data 404 associated with the RGBD training data 406 to identify one or more potential features. For example, the feature detection module or unit 402 may perform FAST feature detection to determine features within the color data 404.

The features may be provided to a discard module or unit 408. The discard module or unit 408 may discard or prune the features based on the depth data 410. For instance, features with unreliable depths are discarded. The remaining features may be provided to an alignment module or unit 412 together with a gravity and/or magnetic vector 414, the camera pose data 416, and the color and depth camera intrinsic parameters 428. The alignment module or unit 412 may align the features using a gravity and/or magnetic vector 414, camera pose data 416 (for correction of perspective distortion), and the RGBD data 406.

The gravity or magnetic aligned features are provided to a world feature coordinates module or unit 416 together with the camera pose data 408. The world feature coordinates module or unit 416 may determine world feature coordinates. For example, the world feature coordinates module or unit 416 may determine 3D keypoints associated with the feature and the environment or scene. The world features and the 3D keypoints may be stored in a world feature datastore 418 for use in training or localization.

The gravity aligned features as well as color data 404 are also received by a feature description module or unit 420. The feature description module or unit 420 determines feature descriptors for each gravity aligned feature. In some cases, feature descriptions may include upright descriptors and/or magnetic descriptors in addition to other descriptors, such as BRIEF descriptors, color descriptors, texture descriptors, shape descriptors, motion descriptors, among others. In some cases, the feature description module or unit 420 may generate keypoint-descriptor pairs.

In some examples, a LSH index module or unit 424 may utilize the 3D keypoints and the features descriptors to generate an LSH index mapping the keypoint indices to the feature descriptors. In some cases, the LSH mapping may be 1:1 correspondence.

The feature descriptors and the LSH index may be stored in world feature descriptors index 426 with the 3D keypoints or world coordinates and the metadata associated with each training RGBD frame (e.g., 2D feature location for each stored feature, the index of the RGBD data, the camera pose associated with the RGBD data, etc.).

Figure 5:
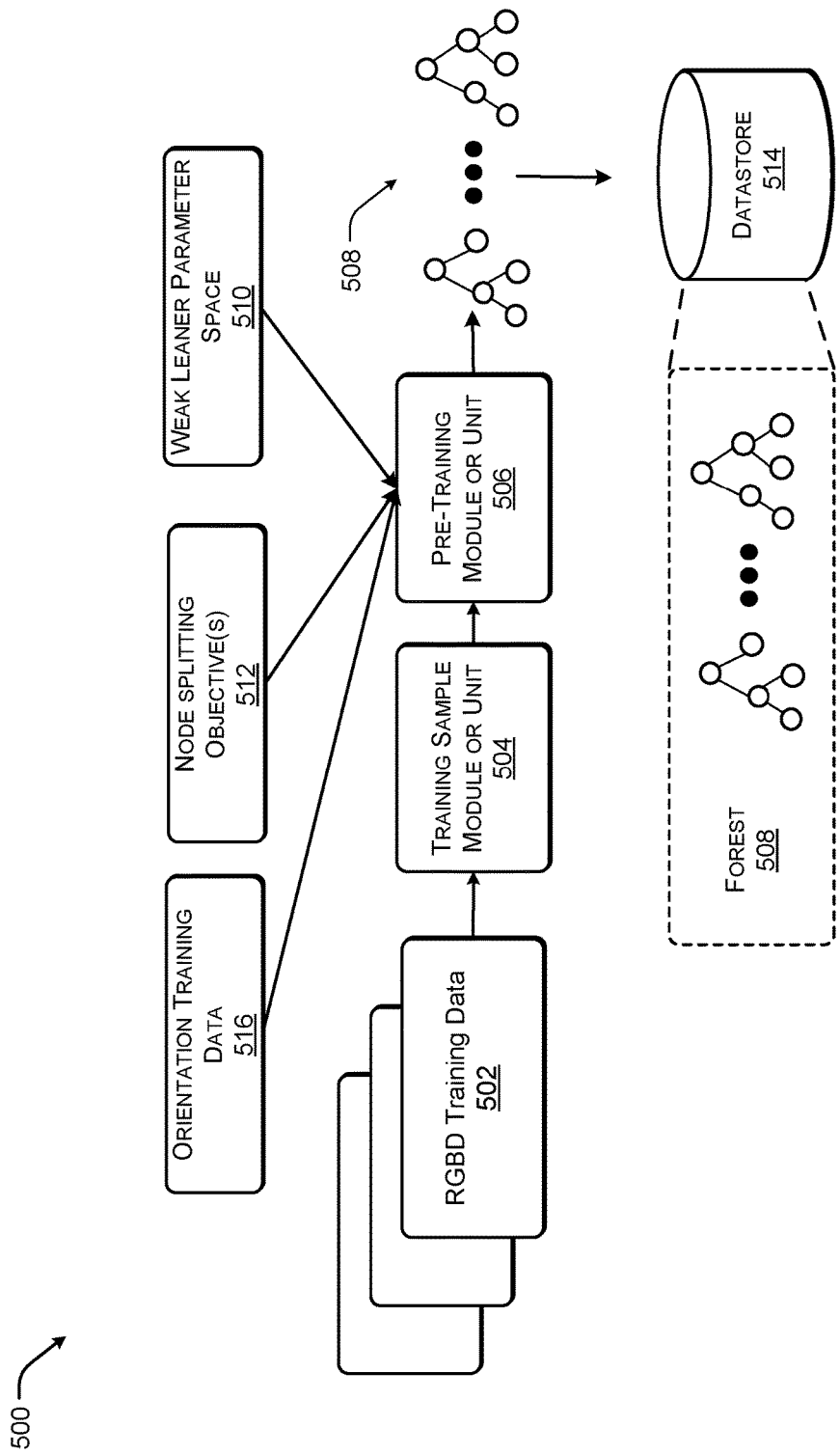
FIG. 5 is an example partial block partial flow diagram showing an illustrative spatial interaction system for pre-training according to some implementations.

FIG. 5 is an example block diagram showing an illustrative spatial interaction system 500 for pre-training according to some implementations. In some implementations, the spatial interaction system 500 may utilize a regression forest approach to map 2D image appearance to the 3D geometry of the environment. In this example, the spatial interaction system 500 may use a set of training images or RGBD training data 502 to train the descriptors during an offline pre-training phase. The leaf nodes may then be trained or updated in substantially real-time as new image data specific to a physical environment or scene is received, as illustrated below with respect to FIG. 6.

In the illustrated example, a training sample module or unit 504 may generate training samples from the RGBD training data. For example, the training sample module or unit 504 may generate a dataset including a weak learner parameter space and a plurality of training features. In some cases, the training features may include gravity aligned features and/or magnetic aligned features. The training samples are utilized by a pre-training module 506 to train the interior nodes of the trees of the forest 508. In the current example, the pre-training module 506 may train the interior nodes using a weak learner parameter space 510 and one or more splitting objective 512. In some examples, the pre-training module 506 may also receive orientation training data 516 to assist in aligning the nodes along an orientation vector. For example, the pre-training module 506 may receive IMU data to assist with aligning the nodes along a gravity vector or magnetic vector.

In some cases, the pre-training module 506 may operate in an offline mode to precompute the trees of the forest 508, such that the leaf node training may be performed in substantially real-time or in real-time. In some examples, the offline or pre-training may be performed by remote servers and downloaded or otherwise provided to the local spatial interaction system 500 during creation of an environment specific virtual scene. Thus, the spatial interaction system 500 may be a distributed system in some implementations. The precomputed forest 508 may be stored in a datastore 514.

Figure 6:
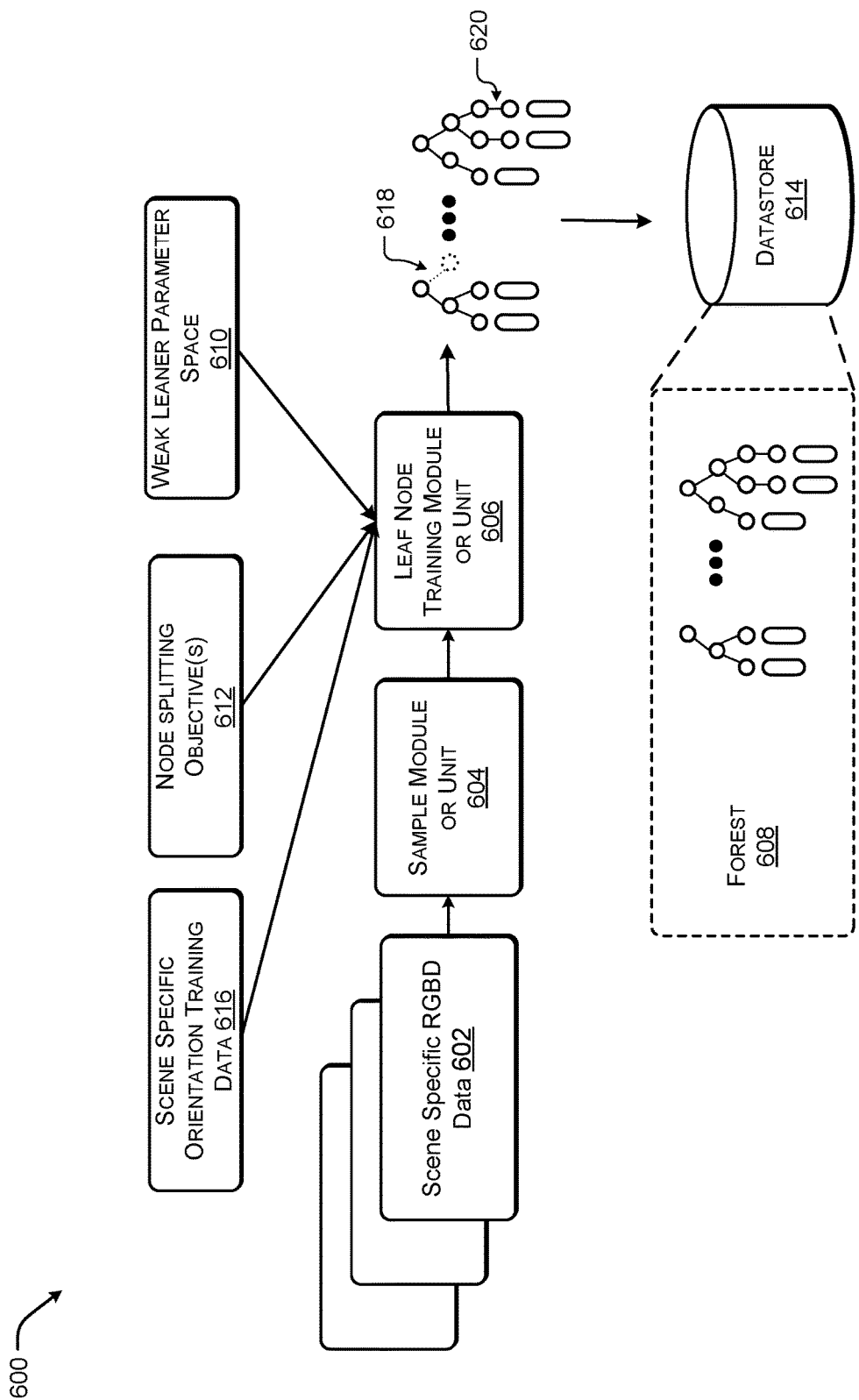
FIG. 6 is an example partial block partial flow diagram showing an illustrative spatial interaction system for leaf node training according to some implementations.

FIG. 6 is an example block diagram showing an illustrative spatial interaction system 600 for leaf node training according to some implementations. In some implementations, the spatial interaction system 600 may utilize a regression forest approach to map 2D image appearance to the 3D geometry of the environment. In this example, the spatial interaction system 600 may use a set of training images or RGBD training data to train the descriptors during an offline pre-training phase, as discussed above with respect to FIG. 5. The leaf nodes may then be trained or updated in substantially real-time as discussed below.

In the illustrated example, a sample module or unit 604 may generate scene specific samples from the scene specific RGBD training data 602. For example, an individual may generate a virtual representation of a specific physical environment (e.g., a user's home, bedroom, office, backyard, etc.). In these cases, the scene specific RGBD data 602 may be captured of the specific physical environment. The scene specific samples may be provided to a leaf node training module 606 and used to train the trees of the forest 608 based on weak learner parameter space 610 and one or more node splitting objectives 612. In some examples, the leaf node training module 606 may also receive scene specific orientation training data 616 to assist in aligning the nodes along an orientation vector. For example, the pre-training module 506 may receive IMU data to assist with aligning the nodes along a gravity vector or magnetic vector. In some cases, the IMU data may be associated or captured by the color or depth camera.

In some examples, the training module 606 may remove branches 618 that are empty and add branches 620 that are missing from the trees based on the scene specific samples. In some cases, the spatial interaction system 600 may utilize both remote and proximate computing resources to perform the leaf node training. Thus, in some cases, the leaf node training module 606 may be a distributed across computing resources. The updated forest 608 may be stored in a datastore 614.

Figure 7:
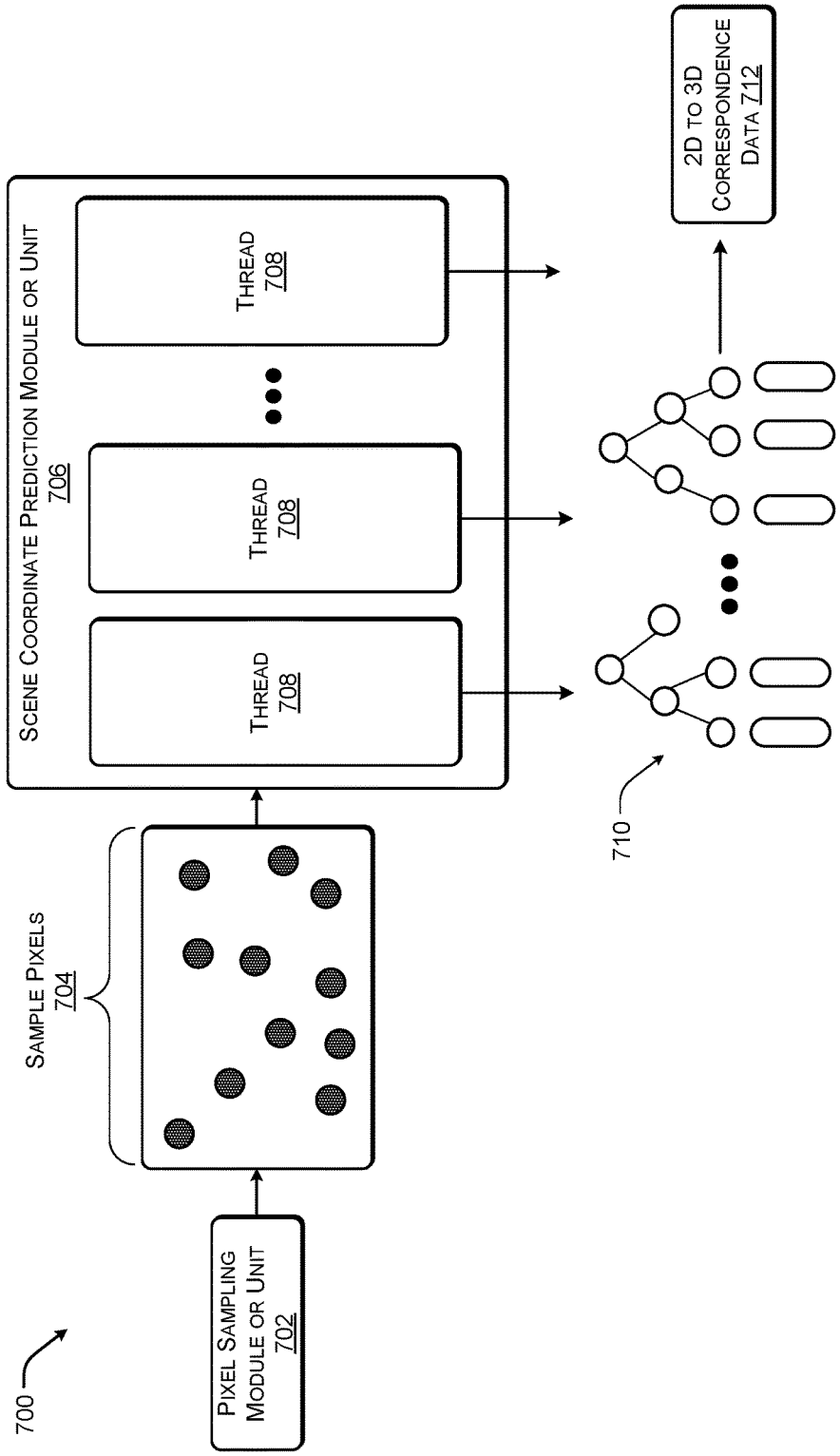
FIG. 7 is an example partial block partial flow diagram showing an illustrative spatial interaction system for pre-computing scene coordinates predictions for use in relocalization within a virtual environment according to some implementations.

FIG. 7 is an example block diagram showing an illustrative spatial interaction system 700 for precomputing scene coordinates predictions for use in relocalization within a virtual environment according to some implementations. In the illustrated example, the spatial interaction system 700 may utilize a relocation forest. In this example, the spatial interaction system 700 may precompute 2D to 3D matches prior to determining a camera pose and relocalizing within a scene. For instance, the spatial interaction system 700 may include a pixel sample module or unit 702 to sample pixels 704 from RGBD data and precompute a number of randomly generated 2D to 3D matches between individual pixels of the sample pixels 704. In some example, spatial interaction system 700 may store the random matches in adjacent memory cells of a memory device to improve system processing speed and throughput associated with memory access during run time. In some cases, the precomputed samples may be selected from the RGBD data at location in which the RGBD data has high gradient to increase reproducibility of the features over random sampling.

In the current example, the 2D to 3D matches may be precomputed once for all possible pose hypothesis in parallel, in contrast to conventional systems that sample the image multiple times for each individual pose hypothesis. In this manner, a scene coordinate prediction module or unit 706 may utilize multiple threads 708 to perform operations associated with computing the 2D to 3D matches in parallel which may significantly improve the speed and throughput of the spatial interaction system 700. Once the 2D to 3D matches are known, the spatial interaction system 700 may determine 2D to 3D correspondences 712 to locate the camera pose within the virtual environment based at least in part on the relocalization forest 710 and the 2D to 3D matches.

In another example, rather than accumulating samples of 2D to 3D matches, the spatial interaction system 700 may accumulate the sample pixels 704 into a voxel grid or a volume to model the probability density function of the 2D to 3D mapping. Thus, for each leaf node there is a voxel grid approximating the 3D distribution of features with similar image appearance. Said probability distribution function would be used to improve the accuracy of the pose hypothesis estimation and validation. For example, the precomputed voxel grid may be used during pose estimation to rank the hypotheses based on the likelihood of occurrence of all the observed features in the image.

Figure 8:
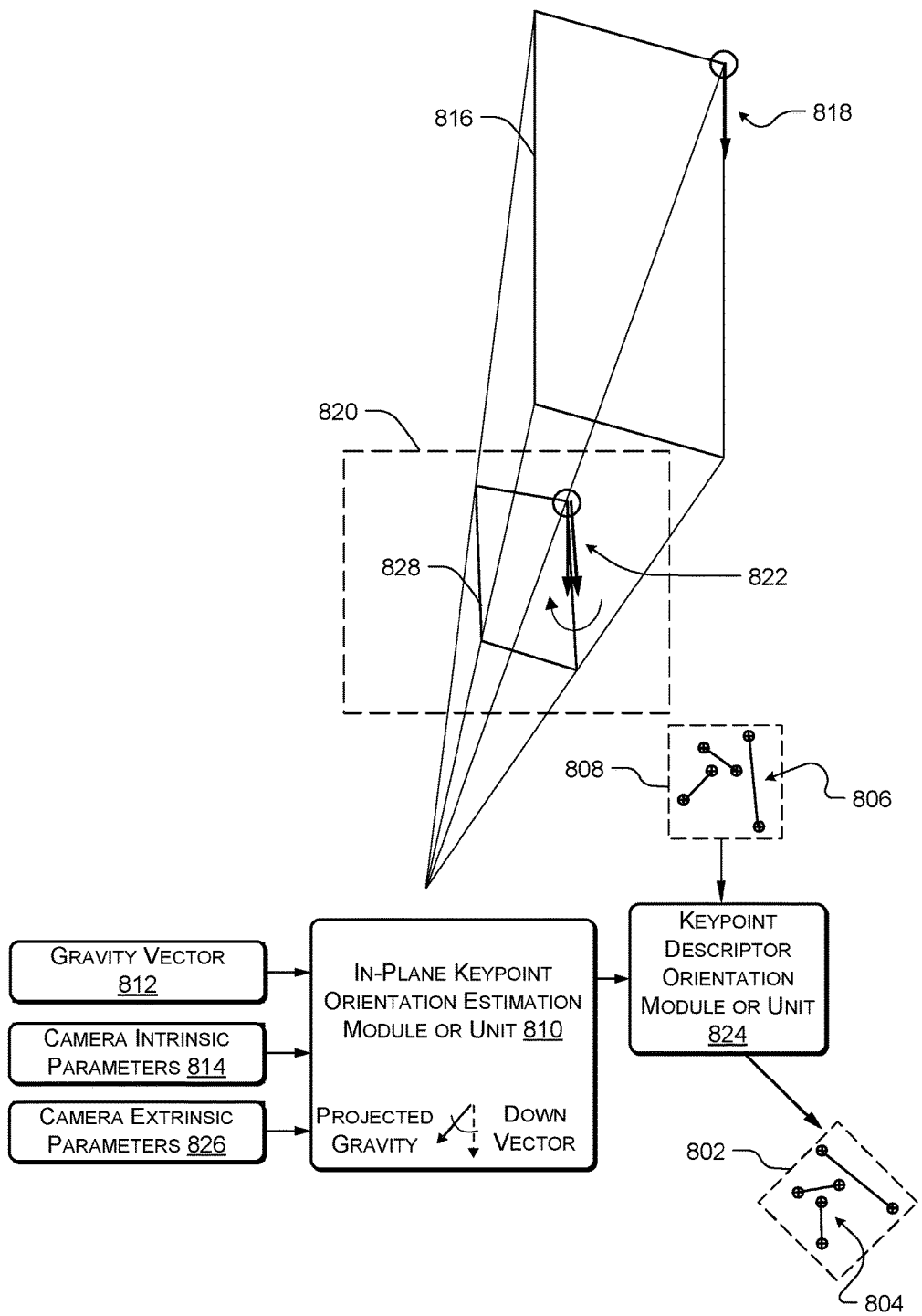
FIG. 8 is an example partial block partial flow diagram showing an illustrative spatial interaction system for providing perspective and distortion aware gravity aligned features according to some implementations.

FIG. 8 is an example partial block partial flow diagram showing an illustrative spatial interaction system 800 for providing perspective and distortion aware gravity aligned features according to some implementations. In the current example, the perspective and distortion aware gravity aligned features are represented using gravity aligned keypoint descriptors 802 which are described using a plurality of comparisons of pixel pairs, generally indicated by 804. During training and relocalization, the initial keypoint descriptor 808 is aligned to a canonical orientation, resulting in an oriented version of the descriptor 802. This canonical feature descriptor allows for improved feature matching between 2D features 828 observed in the relocalization image 820 and 3D model features 816 learned during training. Once the mapping for multiple 2D features 828 to 3D world features 816 are known, the camera pose may be estimated.

In the illustrated example, an in-plane keypoint orientation estimation module or unit 810 may estimate in-plane keypoint orientation using a filtered gravity vector 812, intrinsic parameters 814 from a camera, and extrinsic parameters 826 from the camera. For example, the in-plane keypoint orientation estimation module or unit 810 may suspend keypoints in a 3d scene or geometry 816 and draw the gravity vector 818 using the IMU gravity associated with a camera capturing the image data. The in-plane keypoint orientation estimation module or unit 810 may then project the gravity vector 818 into the 2D image plane 820 to a 2D gravity and down direction 822, which allows for an in-plane orientation.

Figure 9:
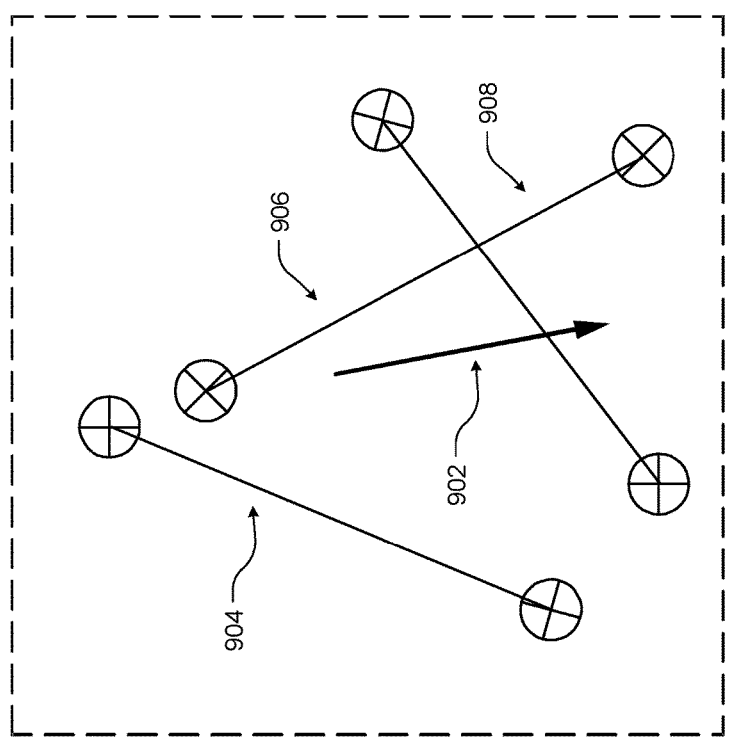
FIG. 9 is an example anisotropic gravity aligned feature descriptor according to some implementations.

A keypoint descriptor orientation module or unit 824 may then orientate or align the keypoint descriptor 808 using in-plane angle estimation of 810 to generate the gravity oriented keypoint descriptor 802. The initial descriptor pixel comparisons 806 will then appear aligned with projected the gravity vector 822 resulting in a gravity oriented set of pixel comparisons 804. As described below in more detail with respect to FIG. 9, the use of the 2D gravity and down direction 822 to orientate the pixel comparison pairs 804 allows for selection of a discriminative random/anisotropic descriptor 802 that improves feature recognition under arbitrary rotations of the camera around its focal axis.

In the illustrated example, the input keypoint descriptor 808 is aligned using a gravity vector 818, however, it should be understood that in other examples, other types of orientation vectors may be used in a manner discussed above to align the keypoint descriptors in a common orientation. For example, in some cases, magnetic vectors may be utilized to align the keypoint descriptor 808, as discussed above FIG. 9 is an example anisotropic gravity aligned feature descriptor 900 according to some implementations.

For example, the spatial interaction system described herein may utilize orientation descriptors to assist with hypothesis testing during relocalization. The spatial interaction system may utilize the anisotropic gravity aligned feature descriptor 900 to take into account perspective distortion and lens distortion. Thus, the spatial interaction system may compute the direction of the projected gravity vector 902 and orientate the feature descriptors using the projected gravity vector 902. The use of the anisotropic gravity aligned feature descriptor 900 improves the discriminative power of the feature descriptors by allowing pixel comparisons in random directions opposed to conventional system that rely on comparisons in the direction of the image gradient. The randomness of the pixel comparison pairs within the anisotropic gravity aligned feature descriptor 900 allow for pixel comparisons that are substantially less correlated which improves the spatial interaction system ability to differentiate between similar texture patterns with different orientations. In some cases, the lens distortion correction would improve the descriptor matching accuracy. For example, when using wide angle cameras, the features detected near the boundaries of the images would present heavy distortion. Inverting the effects of lens distortion would make the image descriptors more similar to the training descriptors and therefore the descriptor matching and pose estimation accuracy would be improved. Similarly taking perspective distortion into account allows the spatial interaction system to correct for the perspective distortion effects (for example parallel lines in 3D not being parallel once projected into the image plane), as a result the descriptor matching and pose estimation accuracy would be improved.

In the illustrated example, the anisotropic gravity aligned feature descriptor 900 includes the projected gravity vector 902 as well as pixel comparison pairs 904, 906, and 908. As shown, the pixel comparison pairs 904,906,908 can have arbitrary directions with respect to the projected gravity direction 902. Therefore, the pixel comparison are less correlated than conventional approaches which present most of the pixel comparison pairs almost parallel to the image gradient vector.

Figure 10:
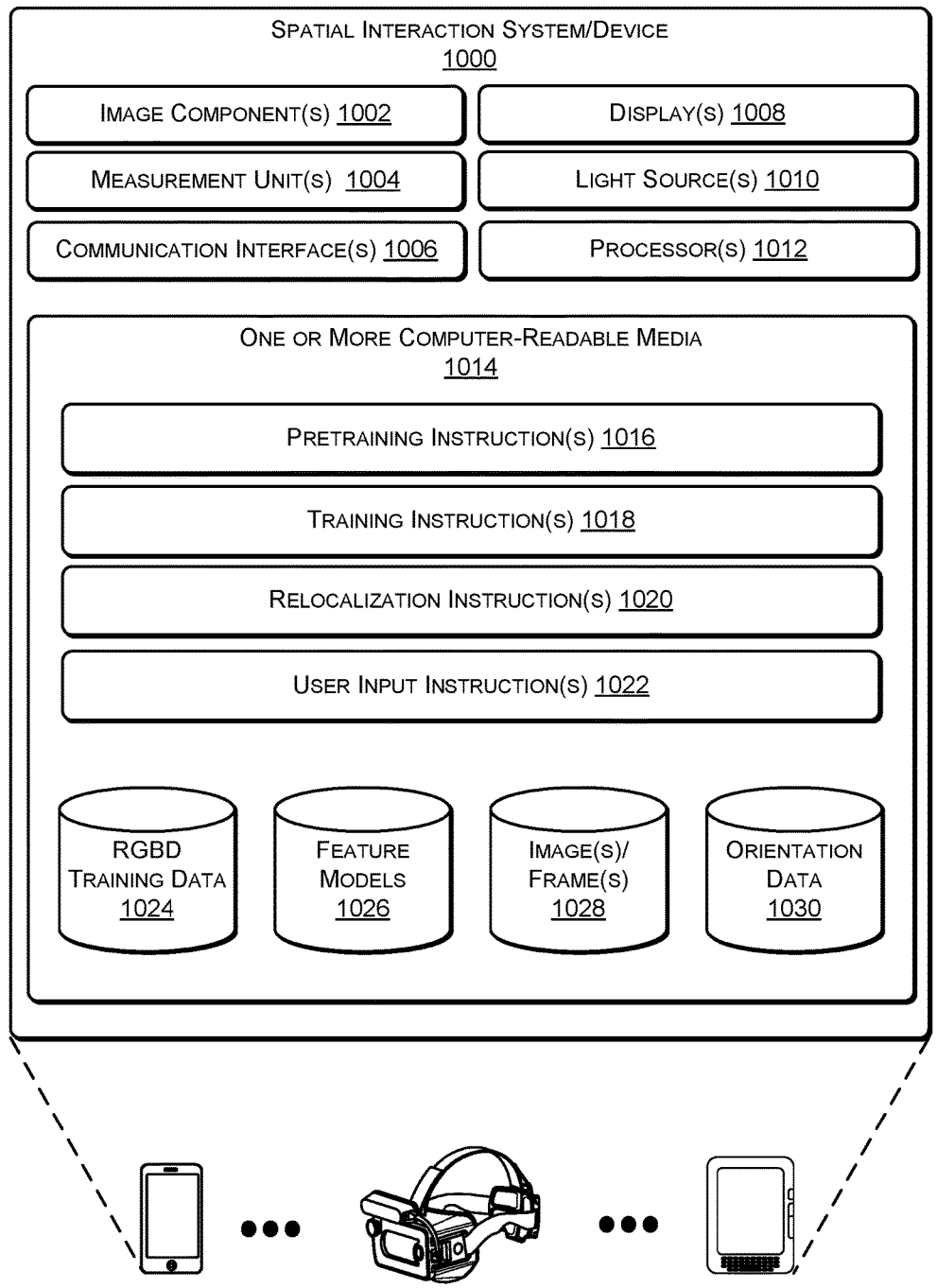
FIG. 10 is an example spatial interaction system according to some implementations.

FIG. 10 is an example spatial interaction system 1000 according to some implementations. In some cases, the spatial interaction system 1000 may be a combination of an electronic device and a headset or be a self-contained unit for determining a pose of a physical object. In the current example, the spatial interaction system 1000 may include image components 1002 for capturing visual data, such as images or frames, from a physical environment. For example, the image components 1002 may be positioned to capture multiple images from substantially the same perspective as the user (e.g., a position proximate the user's eyes or head) in order to incorporate the image data associated with the captured image into the virtual environment. The image components 1002 may be of various sizes and quality, for instance, the image components 1002 may include one or more wide screen cameras, 3D cameras, high definition cameras, depth cameras, video cameras, among other types of cameras. In general, the image components 1002 may each include various components and/or attributes.

In some cases, the pose of an object may be determined with respect to a perspective of the image system 1000 and/or the user that may change as the image system 1000 and/or the user moves within the physical environment. Thus, the image system 1000 may include one or more measurement units 1004 to determine the orientation data of the spatial interaction system 1000 (e.g., acceleration, angular momentum, pitch, roll, yaw, etc. of the spatial interaction system 1000). The measurement units 1004 may include one or more IMUs, one or more accelerometers, one or more gyroscopes, one or more magnetometers, and/or one or more pressure sensors, as well as other sensors. In one particular example, the measurement units 1004 may include three accelerometers placed orthogonal to each other, three rate gyroscopes placed orthogonal to each other, three magnetometers placed orthogonal to each other, and a barometric pressure sensor.

The spatial interaction system 1000 may also include one or more communication interfaces 1006 configured to facilitate communication between one or more networks, one or more cloud-based management system, and/or one or more physical objects, such as controller 1106 of FIG. 11 discussed below. The communication interfaces 1006 may also facilitate communication between one or more wireless access points, a master device, and/or one or more other computing devices as part of an ad-hoc or home network system. The communication interfaces 1006 may support both wired and wireless connection to various networks, such as cellular networks, radio, Wi-Fi networks, short-range or near-field networks (e.g., Bluetooth®), infrared signals, local area networks, wide area networks, the Internet, and so forth. In some cases, the communication interfaces 1006 may be configured to receive orientation data from a separate device such as a controller or IMU unit in close proximity to the spatial interaction system 1000.

In the illustrated example, the spatial interaction system 1000 also includes a display 1008, such as a virtual environment display or a traditional 2D display. For instance, in one example, the display 1008 may include a flat display surface, such as a touch screen or LED display, combined with optical lenses configured to allow a user of the spatial interaction system 1000 to view the display 1008 in 3D.

The spatial interaction system 1000 may also include one or more light sources 1010. In some cases, the light sources 1010 may be configured to activate at high power for a short duration. In some cases, the short duration may be substantially synchronized with an exposure interval of the image components 1002. In other cases, the light sources 1010 may be inferred or otherwise used to perform surface mapping, such as using structured light techniques.

The spatial interaction system 1000 may also include one or more processors 1012, such as at least one or more access components, control logic circuits, central processing units, or processors, as well as one or more computer-readable media 1014 to perform the function associated with the virtual environment. Additionally, each of the processors 1012 may itself comprise one or more processors or processing cores.

Depending on the configuration, the computer-readable media 1014 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1012.

Several modules such as instruction, data stores, and so forth may be stored within the computer-readable media 1014 and configured to execute on the processors 1012. For example, as illustrated, the computer-readable media 1014 pre-training instructions 1016, training instructions 1018, relocalization instructions 1020, and user input instructions 1022. The computer-readable media 1014 may also store various types of data useful to the instructions 1016-1022, such as RGBD training data 1024, feature models 1026, image/frames 1028, and orientation data 1030 (e.g., inertial data from an IMU).

The pre-training instructions 1016 when executed by the processor 1012 may cause the processor 1012 to perform operations associated pre-training feature descriptors and/or interior nodes of a relocation forest as discussed above. The training instructions 1018 may be configured to further train the pretrained feature descriptors and/or the leaf nodes of the relocation forest using scene specific training data as discussed above. The relocalization instructions 1020 may be configured to locate a feature or relocalize a user within a virtual environment using the trained feature descriptors and/or relocation forest as discussed above. The user input instructions 1022 may be configured to receive the user input either via a controller device or as natural user input, such as gestures or audio based inputs.

Figure 11:
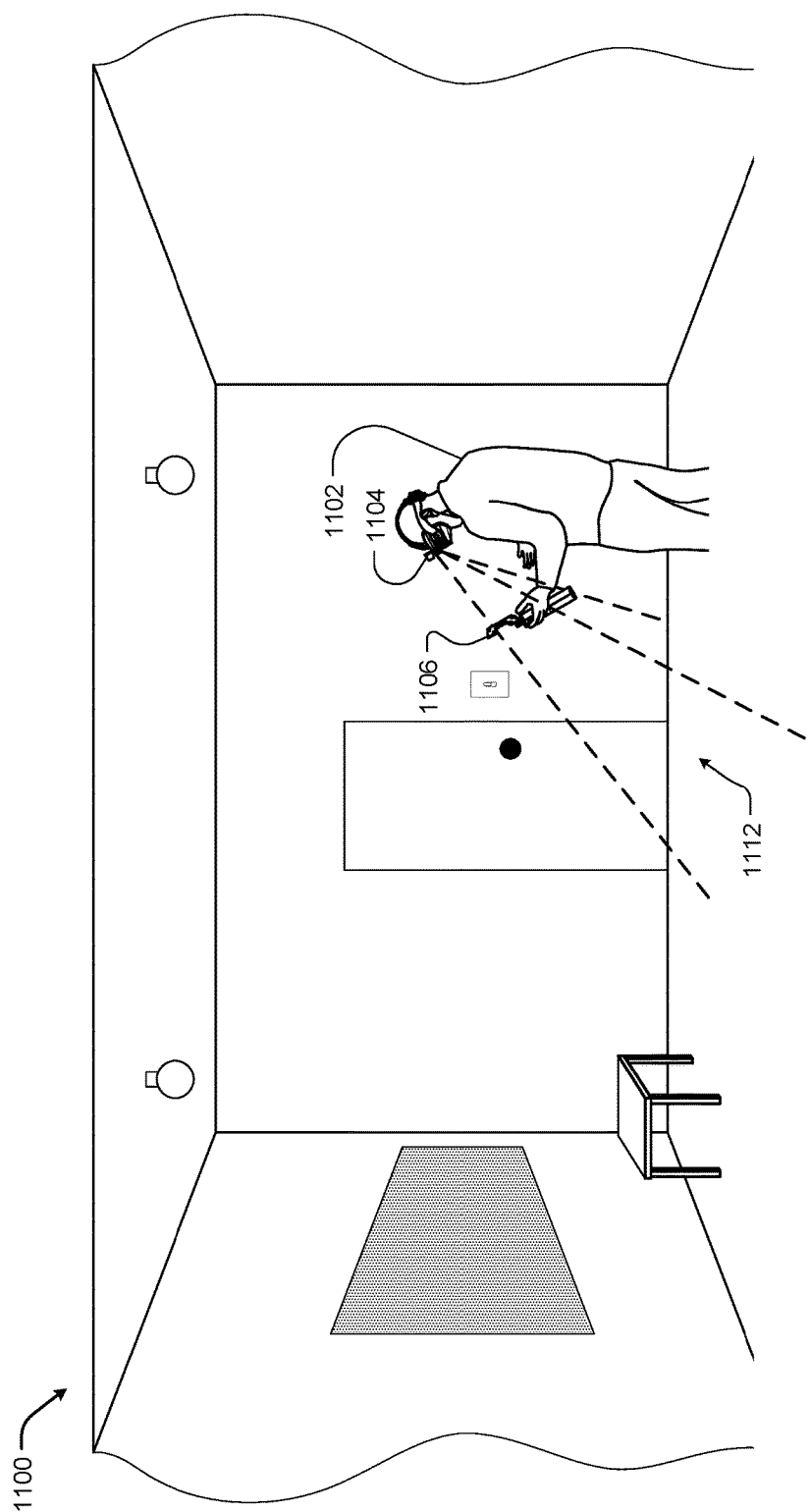
FIG. 11 illustrates an example physical environment including a user of a spatial interaction system including an integrated image capture and display device and a hand held or controller device interacting according to some implementations.

FIG. 11 illustrates an example physical environment 1100 including a user 1102 of a spatial interaction system including an integrated image capture and display device 1104 and an optional hand held or controller device 1104 interacting according to some implementations. Unlike conventional systems that typically rely on multiple external imaging devices positioned in the physical environment to capture images of physical objects from multiple angles, the spatial interaction system may rely on image capture components that may be approximate to or adjacent to the display device, such that the captured images are from substantially the perspective of the user 1102 and/or the perspective of the spatial interaction system. Thus, unlike the conventional system which restricts the user to a predefined area or space equipped with the external image devices, the spatial interaction system described herein allow the user 102 to move from physical environment to physical environment without additional setup and without interrupting the virtual experience.

In some examples, the spatial interaction system is configured to allow the user 1102 to actively engage with the virtual environment by physically interacting (e.g., moving, arranging, etc.) the physical objects within the physical environment 1100. In these cases, the spatial interaction system may be configured to use IMU or orientation data captured by the controller device 1106 as well as tactical or haptic inputs received at the controller device 1106 as a user input within the virtual environment.

As the user 1102 moves through the physical environment 1100, the display device 1104 allows the user 1102 to view a virtual representation of the physical environment 1100 (e.g., to view a specific virtual environment representative of the physical environment). In other cases, the user 1102 may utilize the spatial interaction system to view a scene or other imaginary virtual environment that may incorporate one or more features of images captured by the device 1104 as, for instance, a user input or manipulatable object within the virtual scene.

Thus, as the user 1102 utilizes the spatial interaction system, the spatial interaction system may locate or relocate features, objects, and/or the user 1102 within a given virtual representation or scene (e.g., the user 1102 may re-enter an existing virtual world). For example, the spatial interaction system may utilize the ORB approach or the relocalization forest approach discussed above to assist with locating features and/or the user 1102 within the virtual environment or scene. While the current example, illustrates a combined image capture and display device 1104, it should be understood that in some implementations the image capture device may be separate from the display device.

In some cases, in addition to relocalization, the methods and system described above may be used by the spatial interaction system during pose recovery when a pose tracker loses tracking. For example, during scanning of the scene or environment, or when tracking within a virtual environment. In other cases, the spatial interaction system may be useful to recognize a scene when revisiting the scene for purposes of loop closing (e.g., when a user revisits the same place multiple times, the system may leverage that knowledge to improve the quality of the 3D reconstructions of the physical environment the user is in).

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a display for presenting a virtual environment to a user;
one or more image components for capturing image data associated with a physical environment surrounding the user;
one or more processors;
non-transitory computer-readable media storing computer-executable instructions, which when executed by the one or more processors cause the one or more processors to perform operations including:
determining a set of features using training red-green-blue depth (RGBD) data associated with a type of scene;
determining one or more feature descriptors associated with the set of features;
determining a 3D gravity vector based at least in part on orientation data associated with the training RGBD data;
gravity aligning individual feature descriptors of the one or more feature descriptors by projecting the 3D gravity vector into a 2D image space;
generating synthetic training data based at least in part on the training RGBD data and at least one of the set of features;
determining one or more candidate features based at least in part on the synthetic training data; and
selecting at least one selected candidate feature of the one or more candidate features to include in the set of features based at least in part on a result of comparing feature descriptors of the one or more candidate features to the individual feature descriptors of the one or more feature descriptors.

2. The system as recited in claim 1, wherein:
the training RGBD data includes images having a first viewpoint of an environment; and
the synthetic training data includes at least a second viewpoint of the environment, the second viewpoint rendered by the system.

3. The system as recited in claim 1, wherein:
the training RGBD data includes images having at least one object within an environment or scene; and
the synthetic training data includes rendering the at least one object under different illumination effects.

4. The system as recited in claim 1, wherein:
the training RGBD data includes images having an object within an environment, the objects having a first set of material characteristics; and
the synthetic training data includes rendering the objects with a second set of material characteristics, the second set of material characteristics different than the first set of material characteristics.

5. The system as recited in claim 4, wherein the synthetic training data includes rendering the objects with a third set of material characteristics, the third set of material characteristics different than the first set of material characteristics and the second set of material characteristics.

6. The system as recited in claim 5, wherein the operations are performed during an offline mode.

7. The system as recited in claim 5, wherein determining the one or more candidate features is based at least in part on color data associated with the training RGBD data.

8. The system as recited in claim 4, wherein training the plurality of the features includes:
discarding feature descriptors of the one or more feature descriptors based at least in part on depth data associated with the training RGBD data;
generating pixel comparison pairs for the individual feature descriptors of the one or more feature descriptors; and
generating a locality-sensitive-hashing index for the individual feature descriptors of the one or more feature descriptors.

9. The system as recited in claim 8, further comprising an inertial measure unit to capture the orientation data.

10. The method as recited in claim 1, wherein the image component is configured to capture the image data from substantially a same perspective as a perspective of the virtual environment.

11. The system as recited in claim 1, wherein:
the training RGBD data includes images having an object within an environment, the objects having a first set of material characteristics; and
the synthetic training data includes rendering the objects with a second set of material characteristics, the second set of material characteristics different than the first set of material characteristics.

12. A method comprising:
receiving training red-green-blue-depth data;
detecting one or more features within the training RGBD data;
determining one or more feature descriptors;
discarding feature descriptors of the one or more feature descriptors based at least in part on depth data associated with the training RGBD data;
determining a 3D orientation vector based at least in part on orientation data associated with the training RGBD data;
aligning individual feature descriptors of the one or more feature descriptors by projecting the 3D orientation vector into a 2D image space;
generating pixel comparison pairs for the individual feature descriptors of the one or more feature descriptors; and
generating a locality-sensitive-hashing index for the individual feature descriptors of the one or more feature descriptors.

13. The method as recited in claim 12, wherein the training RGBD data includes a plurality of frames, each frame having an associated pose data, gravity vector, depth data, and color data.

14. The method as recited in claim 12, wherein the feature descriptors include an orientation descriptor.

15. The method as recited in claim 12, wherein the 3D orientation vector is at least one of a gravity vector or a magnetic vector.

16. The method as recited in claim 12, further comprising:
generating synthetic training data based at least in part on the training RGBD data and at least one of the set of models;
determining one or more candidate feature descriptors from the synthetic training data;
aligning individual candidate feature descriptors of the one or more candidate feature descriptors by projecting the 3D orientation vector into the 2D image space; and
selecting a first candidate feature descriptors to include in the locality-sensitive-hashing index based at least in part on a result of comparing the first candidate feature descriptors to the individual feature descriptors of the one or more feature descriptors.

17. A method comprising:
determining a set of features using training red-green-blue depth (RGBD) data associated with a type of scene;

generating synthetic training data based at least in part on the training RGBD data and at least one of the set of features;

determining one or more candidate features based at least in part on the synthetic training data;

determining a 3D gravity vector based at least in part on orientation data associated with the training RGBD data;

gravity aligning the candidate features based at least in part on the 3D gravity vector; and selecting at least one of the one or more gravity aligned candidate features to include in the set of features based at least in part on a result of comparing individual candidate models of the one or more candidate features to individual ones of the set of models.

18. The method as recited in claim 17, wherein:

the training RGBD data includes images having a first viewpoint of an environment; and the synthetic training data includes at least a second viewpoint of the environment.

19. The method as recited in claim 17, wherein:

the training RGBD data includes images having at least one object within an environment or scene; and the synthetic training data includes rendering the at least one object under different illumination effects.

20. The system as recited in claim 10, wherein the synthetic training data includes rendering the objects with a third set of material characteristics, the third set of material characteristics different than the first set of material characteristics and the second set of material characteristics.

* * * * *